Oct. 30, 1951   J. M. SLAUTH   2,573,228
TRAP
Filed Jan. 28, 1948
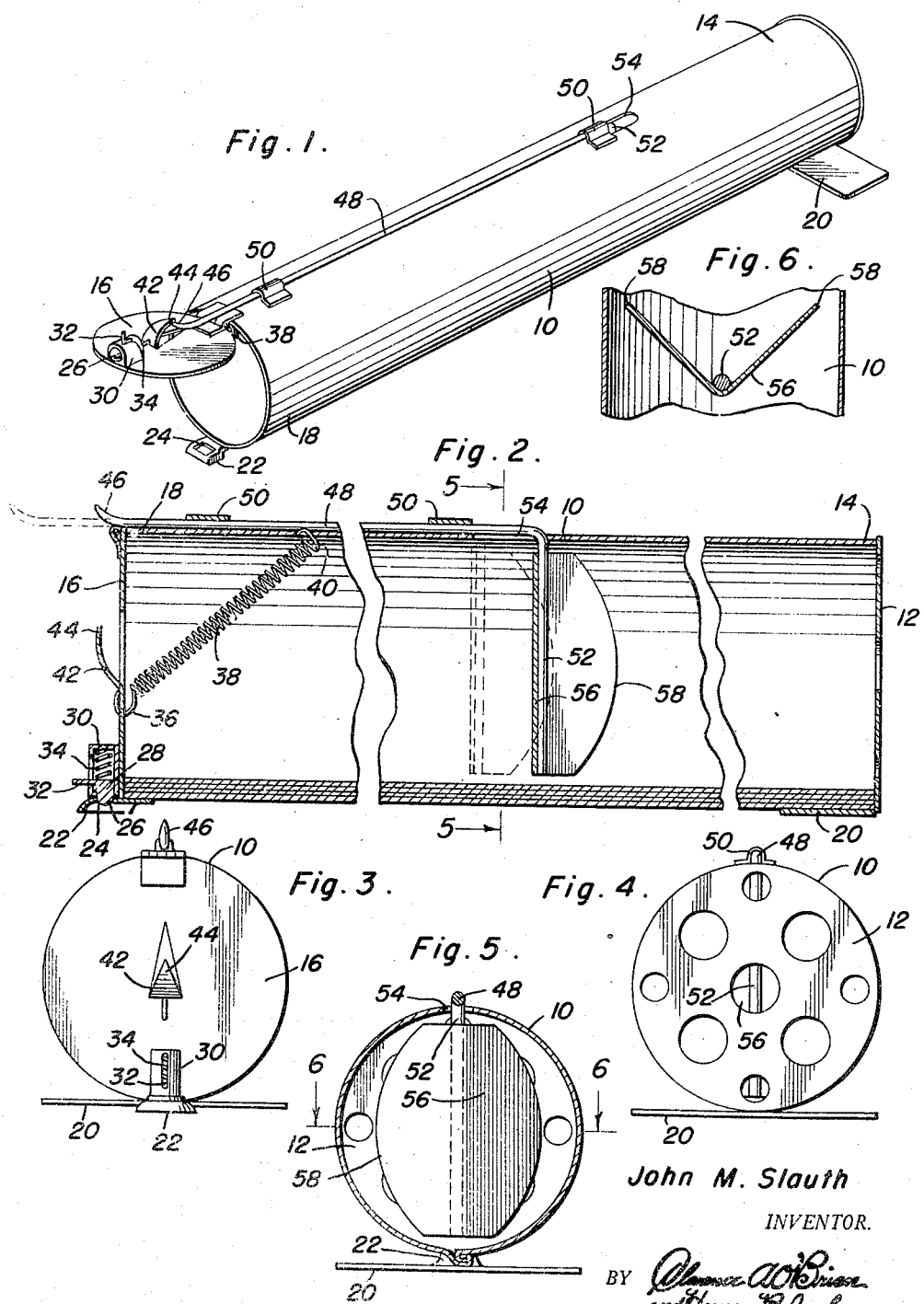
John M. Slauth
INVENTOR.

Patented Oct. 30, 1951

2,573,228

UNITED STATES PATENT OFFICE 2,573,228

TRAP

John M. Slauth, Escondido, Calif.

Application January 28, 1948, Serial No. 4,820

1 Claim. (Cl. 43—61)

This invention relates to new and useful improvements in traps and the primary object of the present invention is to provide a novel and improved baitless animal and rodent trap.

Another important object of the present invention is to provide an animal and rodent trap including a body having a hinged closure and embodying novel and improved means for holding the closure in an open position and for releasing said holding means to effect a closing of the closure and a trapping of the animal or rodent within the body.

A further object of the present invention is to provide a trap that is extremely small and compact in structure and which may be transported or stored in a convenient manner.

A still further aim of the present invention is to provide a trap for animals, rodents and the like that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the animal and rodent trap constructed in accordance with the present invention, and showing the closure in an open position;

Figure 2 is a longitudinal vertical sectional view taken substantially through the center of the present trap, with parts broken away and shown in section, and showing the closure in a closed and locked position.

Figure 3 is an end view of the present trap and showing the closure in a closed and locked position;

Figure 4 is an end view of the present trap taken in an opposite direction from Figure 3;

Figure 5 is a transverse vertical sectional view taken substantially on the plane of section line 5—5 of Figure 2; and Figure 6 is a fragmentary longitudinal horizontal sectional view taken substantially in the plane of section line 6—6 of Figure 5.

Referring now to the drawings in detail, wherein for the purpose of illustration, there is disclosed a preferred embodiment of the present invention, the numeral 10 represents a preferably tubular or sleeve-like body of any suitable material having a fixed, perforated closure 12 at one end 14, and an annular hinged closure 16 at its opposite end 18.

Fixedly secured to the lower periphery of the body 10 adjacent its end 14, is a flat substantially rectangular base or bearing plate 20 which will prevent the body 10 from tipping or rolling when placed on a supporting surface such as the ground. Rigidly secured to the lower periphery of the body 10 adjacent the end 18, is a bearing foot 22 having a concaved seat 24 therein that frictionally engages the spherical or rounded end 26 of a spring urged locking member 28 that is mounted in a casing 30 fixed to the outer face of the closure 16 for holding the closure 16 in a closed and locked position. The member 28 includes an outwardly projecting arm or finger receiving portion 32 that slidably engages a slot 34 provided in the casing 30 whereby the member 28 may be raised to disengage the end 26 from the seat 24.

Removably engaging a suitable aperture in the closure 16, is one end 36 of a coil spring 38 the opposite end 40 of which removably engages further apertures provided in the upper periphery of the body 10 for normally urging the closure 16 in a closed position. Struck outwardly from substantially the center of the closure 16, is an arcuate, substantially triangular support tongue 42 the free pointed end 44 of which frictionally engages the upturned, lip portion 46 of a trigger rod 48 that is slidably mounted in guide sleeves 50 fixed to the upper periphery of the body 10. The opposite end 52 of this rod 48 is angulated to slidably engage a slot 54 provided in the upper periphery of the body 10. Rigidly secured to the end 52 and loosely positioned in the body 10, is a substantially V-shaped contact plate or panel 56 the free arcuate edges 58 of which extend toward the closure 16.

In practical use of the device, the rod 48 is slid forwardly so that the lip 46 engages the pointed end 44 of tongue 42, as shown in Figure 1, to hold the closure 16 in a raised position. As an animal or rodent enters the body 10 and engages the panel 56, the rod 48 will be pushed rearwardly disengaging the lip 46 with tongue 42 and spring 38 will cause the closure 16 to be closed and the end 26 will lockably engage seat 24 to prevent the animal or rodent from reopening the closure 16.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An animal trap comprising an elongated cylindrical body having forward and rear ends, said body having upper and lower outer surfaces, a perforated closure plate at the rear end of said body, a supporting plate secured to the lower surface of said body at the rear end thereof and adapted to bear upon a supporting surface, a plurality of guides secured to the upper surface of said body, a substantially L-shaped latch bar having its longer leg slidably received on the outer periphery of said body and in said guides, said body having a longitudinally extending slot in its upper surface and intermediate the ends of said body, the shorter leg of said L-shaped latch bar being slidably received in said slot, a closure at the forward end of said body, a hinge securing the closure to the upper surface of said body, a spring member within the body and connecting the closure to the body and urging the closure to a lowered and closed position, a support tongue struck from the closure, said latch bar having an upturned lip portion for engaging the support tongue to retain the closure in a raised and open position, a contact plate mounted on the shorter leg of said latch bar and received in said body for engagement by an animal to move the latch bar rearwardly and disengage the lip portion from the support tongue, a bearing foot secured to the lower surface of said body at the forward end thereof, and interlocking means between said bearing foot and said closure for locking the latter against pivotal movement in its closed position.

JOHN M. SLAUTH.

REFERENCES CITED

The following references are of record in the file of this patent:

UNITED STATES PATENTS

| Number | Name | Date |
| --- | --- | --- |
| 123,807 | Bowman | Feb. 20, 1872 |
| 1,044,350 | Clapp | Nov. 12, 1912 |
| 1,100,249 | Newsam | June 16, 1914 |
| 1,261,189 | Tremble | Apr. 2, 1918 |
| 1,456,415 | Wilson | May 22, 1923 |
| 1,793,773 | Brown | Feb. 24, 1931 |
| 1,892,423 | D'Amato | Dec. 27, 1932 |